(12) United States Patent
Roykkee et al.

(10) Patent No.: US 7,778,671 B2
(45) Date of Patent: Aug. 17, 2010

(54) MOBILE COMMUNICATIONS TERMINAL HAVING AN IMPROVED USER INTERFACE AND METHOD THEREFOR

(75) Inventors: Mika Roykkee, Pirkkala (FI); Merja Heino, Tampere (FI); Hannu Korhonen, Tampere (FI)

(73) Assignee: Nokia Corporation, Espoo (FI)

( * ) Notice: Subject to any disclaimer, the term of this patent is extended or adjusted under 35 U.S.C. 154(b) by 910 days.

(21) Appl. No.: 10/961,175

(22) Filed: Oct. 8, 2004

(65) Prior Publication Data
US 2006/0080386 A1  Apr. 13, 2006

(51) Int. Cl.
*H04M 1/00* (2006.01)
*H04B 1/38* (2006.01)

(52) U.S. Cl. .................................... 455/566
(58) Field of Classification Search ............. 455/566
See application file for complete search history.

(56) References Cited

U.S. PATENT DOCUMENTS

| | | | |
|---|---|---|---|
| 6,173,194 B1* | 1/2001 | Vanttila | 455/566 |
| 6,232,969 B1* | 5/2001 | Fawcett | 345/467 |
| 6,264,560 B1 | 7/2001 | Goldberg et al. | |
| 6,608,637 B1* | 8/2003 | Beaton et al. | 715/762 |
| 6,810,272 B2* | 10/2004 | Kraft et al. | 455/566 |
| 6,819,268 B2* | 11/2004 | Wakamatsu et al. | 340/988 |
| 7,216,147 B2* | 5/2007 | Blagsvedt et al. | 709/206 |
| 2003/0040341 A1* | 2/2003 | Casais | 455/566 |
| 2003/0119562 A1 | 6/2003 | Kokubo | |

OTHER PUBLICATIONS

Russian Office Action dated Sep. 19, 2008.

* cited by examiner

*Primary Examiner*—Ajit Patel

(57) ABSTRACT

A mobile communication terminal having a display with an application area thereon. The application area is partitioned into at least two unequally sized sections. The size of the application area allocated to the respective application area sections is dynamically controlled in response to user input.

23 Claims, 11 Drawing Sheets

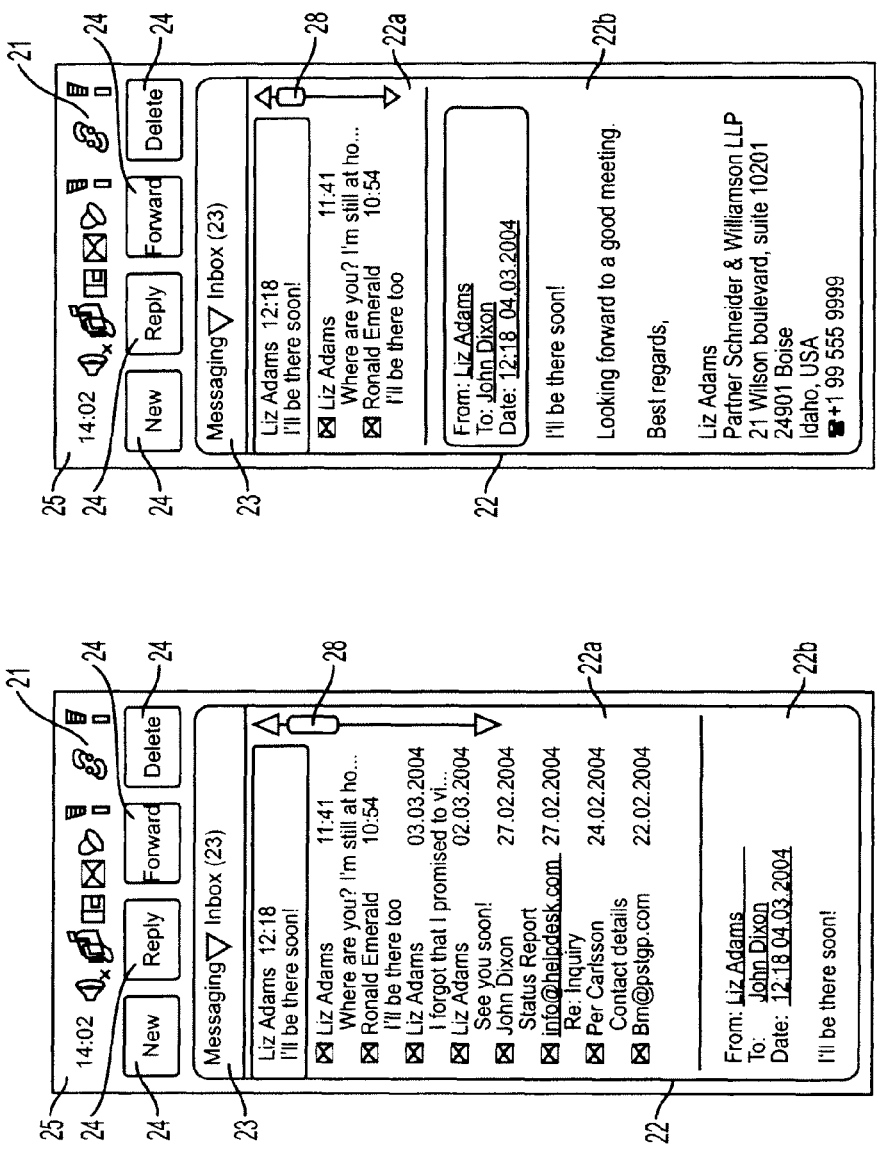

MOBILE COMMUNICATIONS TERMINAL HAVING AN IMPROVED USER INTERFACE AND METHOD THEREFOR

The present invention relates to mobile communication terminals with a graphical user interface and to a method of operating a user interface.

BACKGROUND ART

Mobile communication terminals, e.g. mobile phones, personal digital assistants (PDA) or the like have developed into computer terminals that offer almost the same functionality as a computer workstation or PC. These mobile terminals include office applications, internet browsers and game platforms, etc.

Many of the presently most advanced mobile communication terminals are operated with a Graphical User Interface (GUI) that resembles the GUIs used in workstations and PCs. However, mobile communication terminals generally lack a pointer device such as a mouse and have inherently a significantly smaller available display area than computer workstations and PCs.

Prior art GUIs for mobile communication terminals such as the Symbian Series 60 or the Windows Mobile 2003 Software for Smartphone® therefore, display only one window at a time, and the single window will contain significantly less information than a comparable window in a GUI for a PC or workstation. In the above-mentioned GUIs for mobile communication terminals a contact or phonebook list in a standard configuration shows a list of names without further detail. The entries in the list can be selectively highlighted and when a highlighted entry is selected a new window with the details of corresponding entry is displayed. The user has to close the window containing the detailed contact information in order to return to the list.

Contact lists or phonebooks in a PC or workstation GUI's will in comparable situations be able to display a window with a list of entries in one area of the window and the details of the presently highlighted entry in another area of the window. This way of presenting the information will give the user a better overview and facilitate navigation between entries in the phone or address book. The display size of a mobile communication terminal is, however, insufficient for implementing the PC or workstation type GUI thereon.

DISCLOSURE OF THE INVENTION

The present invention provides a mobile communication terminal comprising a user interface including a display component and an input component, a processor being configured to control operation of the terminal including being configured to receive input from a user through the input component, and to run an application on the terminal, the processor also being configured to show a partitioned application area with two or more application area sections on the display component when an application is running on the terminal, the processor further being configured to at least temporarily define an initial one of the application area sections as a larger application area section as shown within the partitioned application area, and simultaneously at least temporarily define a complementary one of the application area sections as a smaller application area section as shown within the partitioned application area, the processor moreover being configured to at least temporarily redefine the initial one of the application area sections as a smaller application area section as shown within the partitioned application area, and simultaneously at least temporarily redefine the complementary one of the application area sections as a larger application area section as shown within the partitioned application area in response to user input, and the processor being configured to allocate a ratio of respective areas between the larger application area section and the smaller application area section within the partitioned application area.

The present invention provides further a method of operating a user interface of a mobile communication terminal having a display component and an input component, the method comprising the steps of running an application, showing a partitioned application area with two or more application area sections on the display component, temporarily defining an initial one of the application area sections as a larger application area section as shown within the partitioned application area; and simultaneously at least temporarily defining a complementary one of the application area sections as a smaller application area section as shown within the partitioned area, temporarily redefining the initial one of the application area sections as a smaller application area section as shown within the partitioned application area, and simultaneously at least temporarily redefining the complementary one of the application are sections as a larger application area section as shown within the partitioned application area in response to user input, and allocating a ratio of respective areas between the larger application area section and the smaller application area section within the partitioned application area.

The present invention also provides a computer-readable medium containing instructions for controlling a mobile communication terminal with a display component and an input component to show a partitioned application area with two or more application area sections on the display component when an application is running, temporarily define an initial one of the application area sections as a larger application area section as shown within the partitioned application area; and simultaneously at least temporarily define a complementary one of the application area sections as a smaller application area section as shown within the partitioned area, temporarily redefining the initial one of the application area sections as a smaller application area section as shown within the partitioned application area, and simultaneously at least temporarily redefining the complementary one of the application are sections as a larger application area section as shown within the partitioned application area in response to user input, and allocating a ratio of respective areas between the larger application area section and the smaller application area section within the partitioned application area.

With this terminal, method of operating a user interface and computer-readable medium the user has the overview that is normally only possible with a PC or workstation since both application area sections of the application area are visible at all times, whilst the space limitation of the display of the mobile terminal is overcome by dynamically allocating the area available for each of the application area sections.

BRIEF DESCRIPTION OF THE DRAWINGS

In the following detailed portion of the present description, the invention will be explained in more detail with reference to the exemplary embodiments shown in the drawings, in which:

FIG. 2 is a block diagram illustrating the hardware architecture of the mobile communication terminal of FIG. 1a;

FIG. 3 is a block diagram showing the software architecture of the mobile-communication terminal of FIG. 1a;

FIG. 4 is a screenshot of the desktop of the mobile communication terminal of FIG. 1a;

FIG. 5 is a diagram illustrating areas of the display of the mobile communication terminal of FIG. 1a;

FIG. 6 is another screenshot of the mobile communication terminal of FIG. 1a;

FIGS. 9 and 10 are screenshots of a messaging application for the mobile communication terminal of FIG. 7;

DETAILED DESCRIPTION

In the following detailed description, a mobile communication terminal according to the invention in the form of a hand portable phone, preferably a cellular/mobile phone, will be described by the preferred embodiments. The term mobile communication terminal as used here includes all hand portable terminals provided with a form of wireless or wired connection to a network or other terminal. Another example of such a terminal could be a PDA with a Wi-Fi® capability.

Figure 1A:
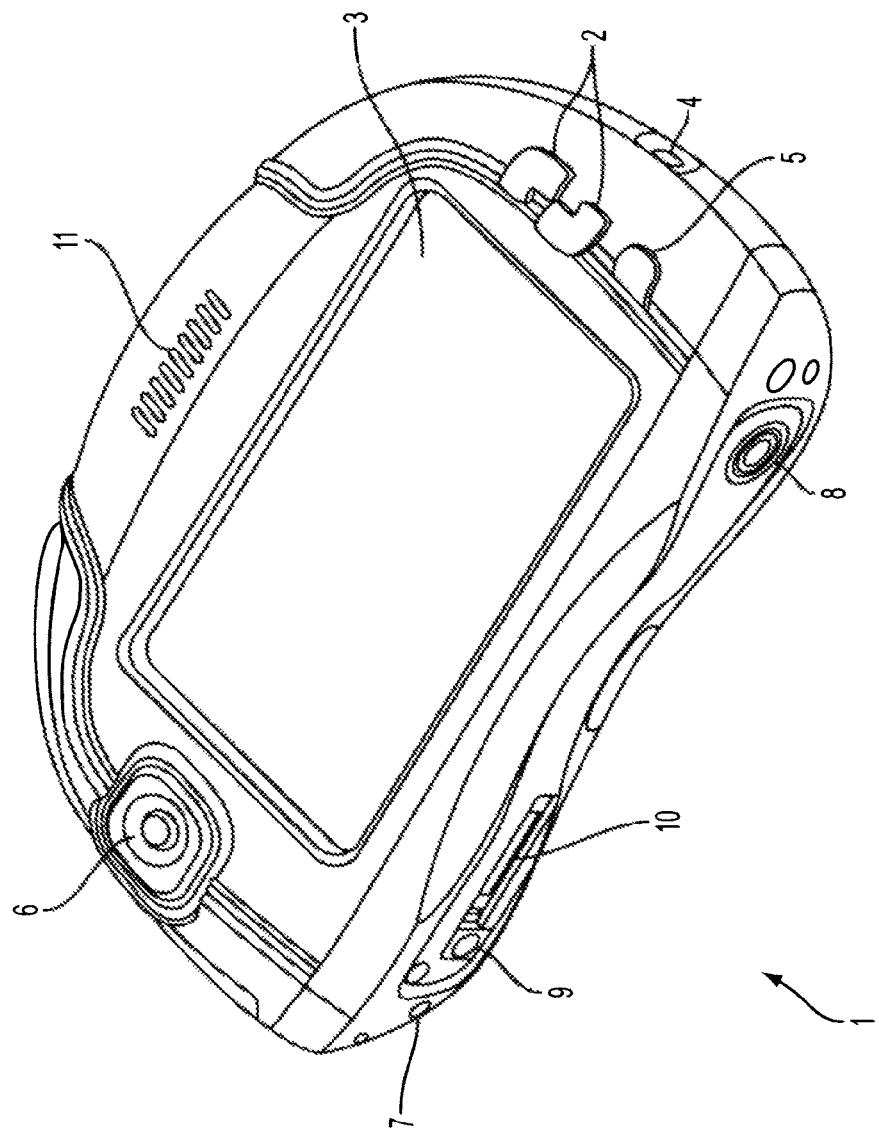
FIG. 1a is a perspective front view of a mobile communication terminal according to a preferred embodiment of the invention.
Figure 1B:
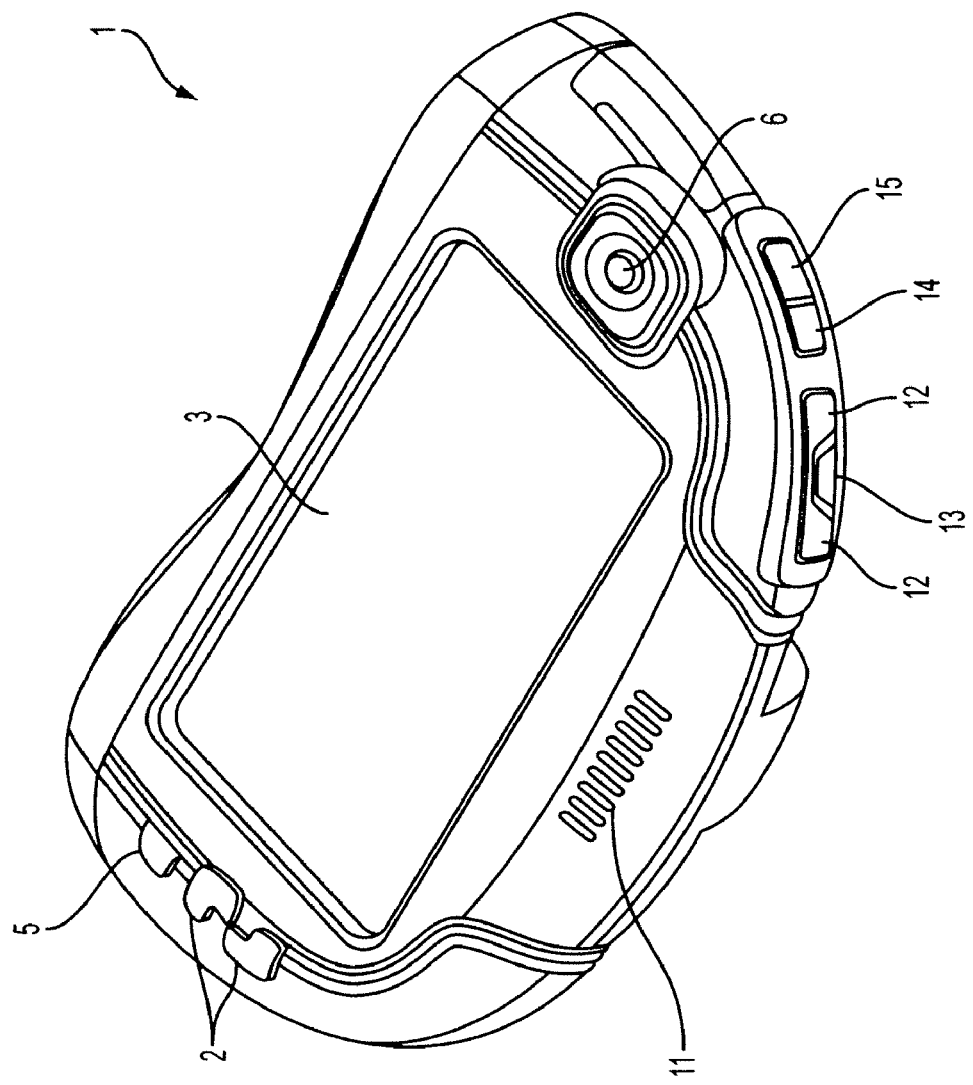
FIG. 1b is another perspective view of the mobile communication terminal of FIG. 1a showing the front and top of the terminal.

Referring now to FIGS. 1a and 1b a mobile phone 1 according to a preferred embodiment of the invention is disclosed. The mobile phone 1 has a housing, switch keys 2, a stylus operated touch screen 3, an on/off button 4, a clear key 5, an earpiece 8 (only the openings are shown), a hands free speaker 11 (only the openings are shown), a microphone 7 (only the opening is shown), a charger connector 9, and a Pop-Port™ 10. The phone 1 according to the preferred embodiment is adapted for communication via a cellular network, such as the GSM 900/1800 MHz network, but could just as well be adapted for use with a Code Division Multiple Access (CDMA) network, a 3G network, or a TCP/IP-based network (e.g. via WLAN, WIMAX or similar).

The mobile phone has a flat touch sensitive display 3 that is typically made of an LCD with optional back lighting, such as a TFT matrix capable of displaying color images.

A releasable rear cover (not shown) gives access to the rechargeable battery pack (not shown) in the back of the phone that supplies electrical power for the electronic components of the mobile phone.

Zoom and switch keys 2 are disposed on the right hand side of the display 3. The function of these keys depends on the application and the current view. When applicable, these keys make the zoom option available, and enable switching between different views in an application. When using the earpiece, pressing these keys is used to increase or decrease the volume level, respectively. The zoom and switch keys 2 are also used for playing games A four-way plus select key 6 is disposed to the left of the display and can be used for cursor movement, scrolling and selecting.

The mobile phone is additionally provided with call handling keys 12 (on-hook and off-hook), a swap key 13, a menu key 14, and a desktop key 15. The two call handling keys 12 are used for establishing a call or a conference call, terminating a call or rejecting an incoming call. The swap key 13 swaps between earpiece 8 and hands free speaker 11. The menu key 14 gives direct access to the menu, repeated presses moves between dialog pages. The desktop key 15 opens the desk application, which is the main view for the terminal.

There are two ways to enter text (letters, numbers and special characters) for entering a telephone number, write a text message (SMS, MMS, e-mail), write a name (associated with the phone number), etc. The first way is by writing characters directly onto the touchscreen 3 using the stylus (not shown). Handwriting recognition transforms the handwriting into characters. The second way is by tapping the characters of an on screen keyboard displayed on the touchscreen.

Figure 2:
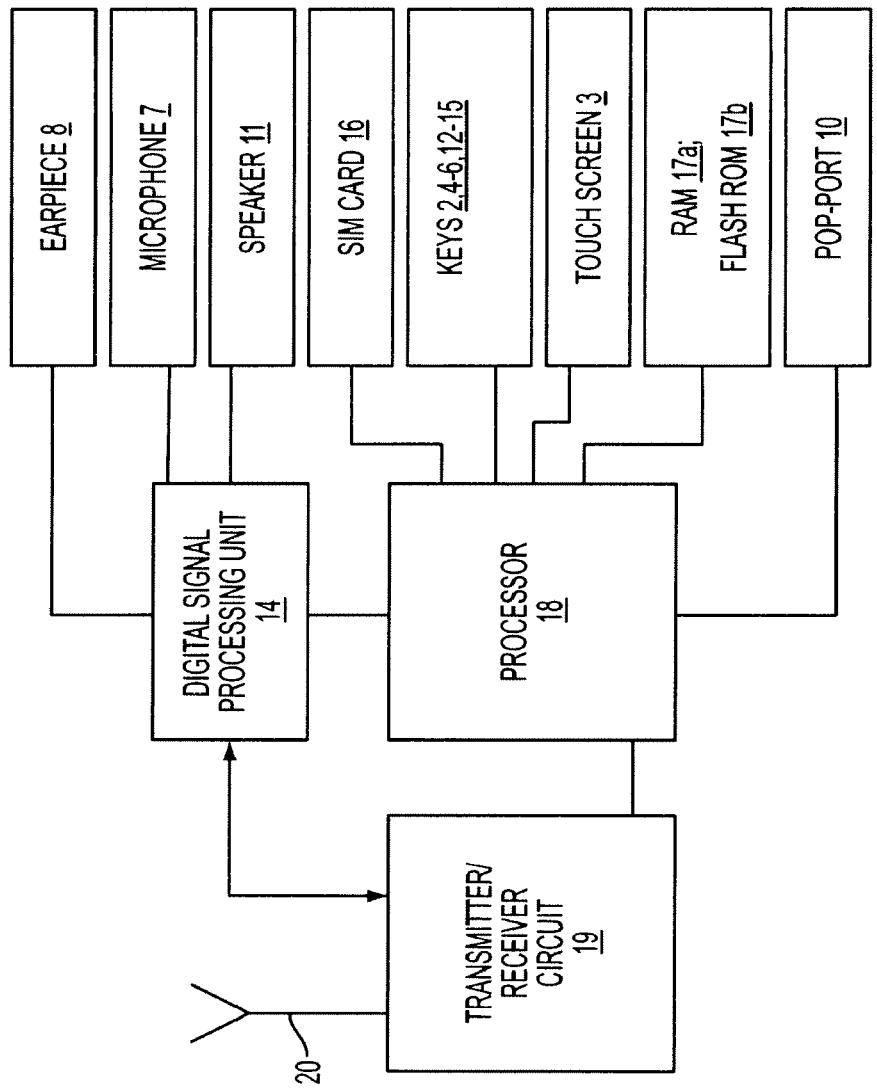

FIG. 2 illustrates, in block diagram form, the hardware architecture of a mobile phone 1 constructed in accordance with the present invention. A processor 18 controls the communication with the cellular network via the transmitter/receiver circuit 19 and an internal antenna 20. A microphone 7 transforms the user's speech into analogue signals, the analogue signals formed thereby are A/D converted in an A/D converter (not shown) before the speech is encoded in a digital signal processing unit 14 (DSP). The encoded speech signal is transferred to the processor 18, which e.g. supports the GSM terminal software. The processor 18 also forms the interface to the peripheral units of the apparatus, including a RAM memory 17a and a Flash ROM memory 17b, a SIM card 16, the touchscreen 3, the, the Pop-Port™ 10 and the keys 2, 4-6, 12-15 (as well as data, power supply, etc.). The digital signal-processing unit 14 speech-decodes the signal, which is transferred from the processor 18 to the earpiece 8 or the hands free speaker 11 via a D/A converter (not shown).

Figure 3:
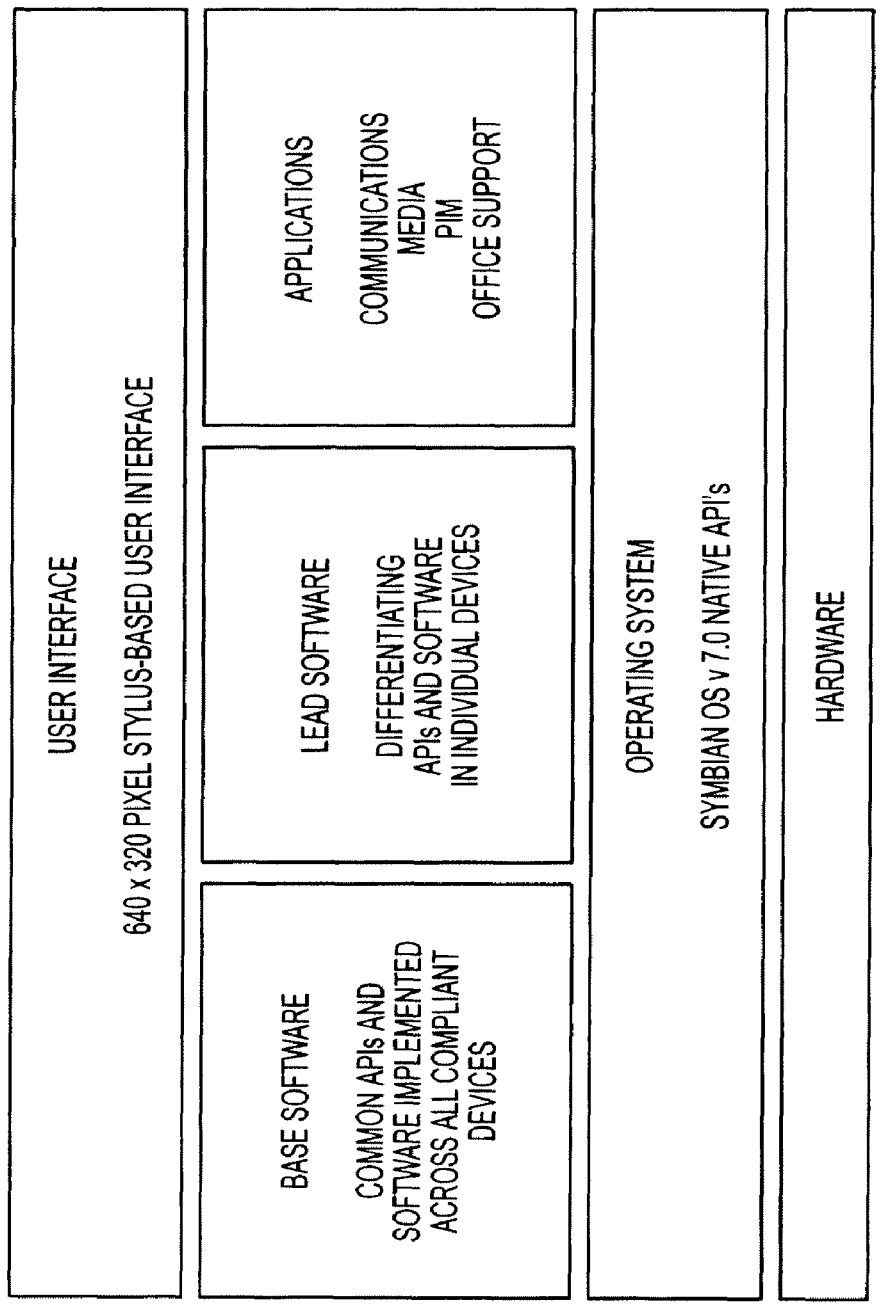

Referring now to FIG. 3 the software architecture of the mobile terminal includes:

the Operating System—Symbian OS v7.0s, which provides fundamental services to Series 90 Developer Platform 2.0;

the base Software—The common set of APIs and software found in all devices that use Series 90

Developer Platform 2.0;

the Lead software—APIs and software that extend Series 90 Developer Platform 2.0 in implementations on a device or range of devices;

applications—Functionality provided to the user, including:

communication applications such as telephone, messaging, and Internet browser with Macromedia Flash player;

media applications such as image viewer, camera, music player, voice recorder, RealPlayer, and FM radio;

personal information manager (PIM) with calendar, tasks, and contacts applications;

office support with word processor, sheet, and presentation viewer applications; and the user Interface—one of a range of user interfaces, device screen orientation and resolution, keyboard, and so forth, implemented on devices that use developer platforms.

Figure 4:
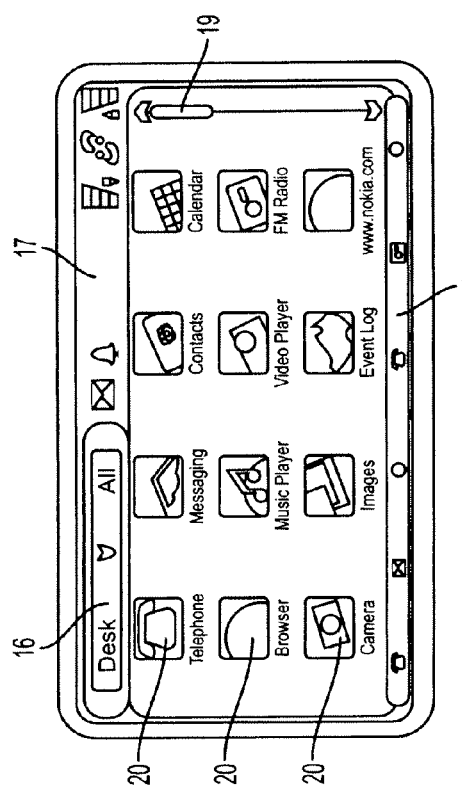

The main view of the terminal is the desktop. A screenshot of the page top is shown in FIG. 4. The desktop includes:

a title area 16 that displays the application name and group, name or other details about the status of the application. Access to menus is gained by tapping on the title area or by pressing the menu key 14;

a status indicator area 17 displaying status icons, indicating mail received, call in progress, silent profile, clock alarm, signal strength, battery level, data connection, etc.;

a toolbar 18, contains either shortcuts to often used applications or, in an application, a shortcut to useful tools;

a scroll bar 19, can be tapped or dragged to scroll the screen.

In most situations both the stylus and the four way key 6 can be used for navigation and the methods can be mixed. Applications are opened by double tapping an application icon 20 (first selecting the application icon and then tapping it again to open it), or by selecting an application icon with the four-way navigation key and then pressing the centre of the four-way navigation key.

Figure 6:
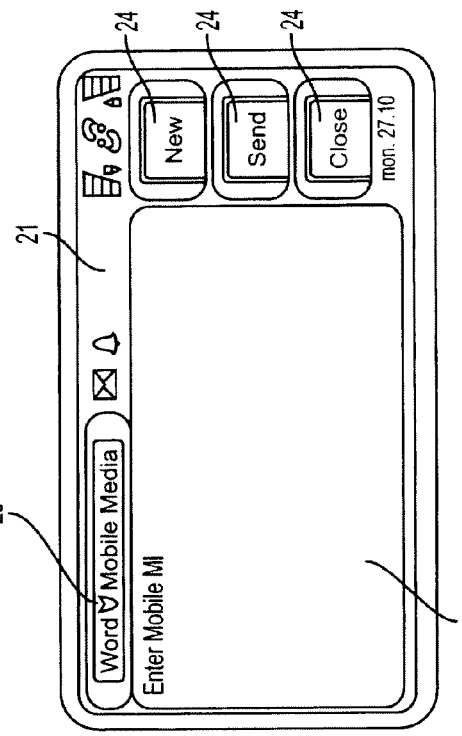
Figure 5:
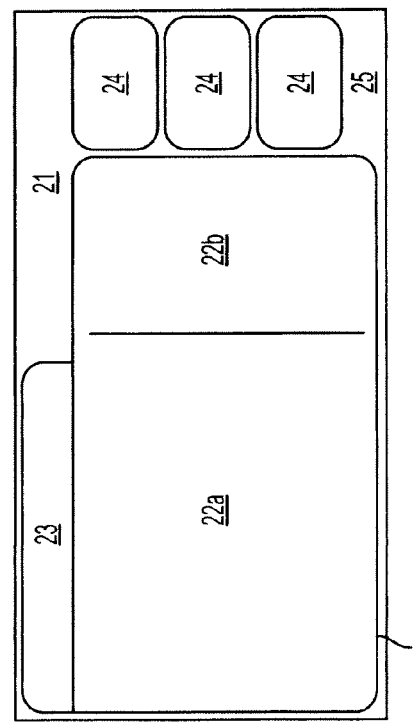

When an application is open the screen changes to the format shown in FIG. 5 with an application area 22, a title area 23 above the application area, command buttons 24 next to the application area, an indicator area 21 with status icons on top and a clock area 25 below the command buttons 24. At the bottom of the touchscreen a toolbar (not shown) can be displayed. A screenshot of an open application, in this case a text editing application is shown in FIG. 6.

Figure 7:
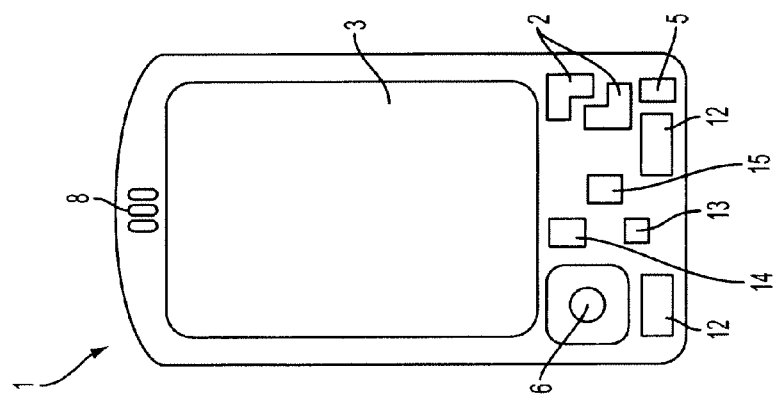
FIG. 7 is a front view of a mobile communication terminal according to another preferred embodiment of the invention.

According to another embodiment shown in FIG. 7, the mobile terminal uses a touchscreen 3 with a portrait layout. The mobile phone 1 according to the second embodiment has substantially the same components, construction, software and hardware architecture as the mobile phone according to the first embodiment. The main difference is in the layout of the touchscreen and the keys, so that the terminal can be used in the upright position with the display in portrait mode. Identical parts of the two embodiments have identical reference numerals. The microphone, charger connector and Pop-Port™ (none shown) are disposed at the bottom of the housing. The opening for the hands free speaker (not shown) is disposed on the right side of the housing.

The desktop of the second embodiment is substantially identical to the desktop shown for the first embodiment, except that the display is in portrait format.

Figure 8:
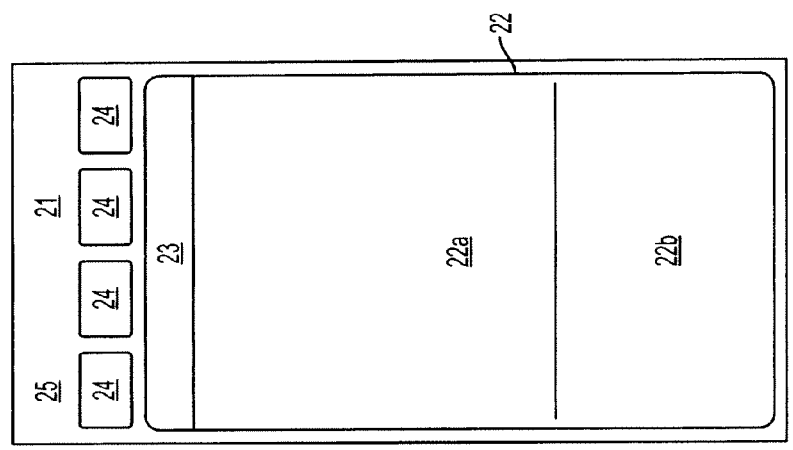
FIG. 8 is a diagram illustrating the areas of the display of the mobile communication terminal of FIG. 7.

When an application is open the screen changes to the format shown in FIG. 8 with an application area 22, a title area 23 above the application area, command-buttons 24 above the title area, an indicator area 21 with status icons and a clock area 25 on top. In some applications, the application area is partitioned into two application area sections 22a and 22b. In some other applications (not shown) the application area is partitioned into three or more application area sections. At the bottom of the display a toolbar (not, shown) can be displayed.

A screenshot of an open application, in this case a messaging application, is shown in FIG. 9. The messaging application can handle several types of messages such as SMS, MMS, e-mail, etc. In FIG. 9 the messages are e-mails. The command buttons 24 have the functions "New" (tapping this command button creates a new message), "Reply" (tapping this command button creates a reply message to the highlighted or open message), "Forward" (tapping this command button creates a forwarding message for the highlighted or open message), and "Delete" (tapping this command button deletes the highlighted or open message). The title area indicates the messaging inbox that contains 23 messages. The application area 22 is partitioned into application area section 22a and application area section 22b.

Application area section 22a displays the messages (the sender and at least a part of the message subject) in the inbox as a scrollable list of selectable items. The messages can be listed in accordance with user selectable criteria such as date of receipt. A scroll bar 28 allows the user to scroll through the list by tapping or dragging with the stylus. The four-way navigation key 6 can also be used to scroll through the list. When the inbox is opened, about three quarters of the application area 22 is allocated to application area section 22a which in this state is considered to be the temporarily larger application area section. This large section can therefore list a substantial number of messages, thus giving the user a good overview over the inbox.

One of the messages in the inbox is highlighted; default is the first massage on the list. The highlighting is obtained by a light blue box (indicating active focus), shown in grey scaling in the Figs. The user can highlight a message by tapping on it with the stylus, or by jumping the highlighting from one message to the next on the list by using the four-way navigation key 6. Information concerning the highlighted message is shown in a temporarily smaller display area section 22b. Only about a quarter of the application area 22 is allocated to display area section 22b, and therefore only the message details and the subject can be shown. Thus, display area section 22b functions in this state as a preview window.

When the user selects the highlighted message in the inbox, about three quarters of the display area 22 is allocated to display area section 22b, which is then considered to be the temporarily larger application area section, as shown in FIG. 10. The message details, subject and a substantial part of the message text (or even the complete message text if it is short) can now the shown in display area section 22b. In this state display area section 22b functions, as a message reading window. Some of the message details in application area section 22b can be selectable items. The highlighting in application area section 22a has changed form light blue to light olive green to indicate that active focus has changed to application area section 22) (light olive green is shown in grey scaling in the Figs). The sender, recipient and subject field in application section 22b is highlighted by a light blue box, shown in grey scaling in the Figs.

If the user returns to the inbox, by e.g. tapping on one of the messages in the inbox in application area section 22a, or by tapping/dragging the scrollbar 28, three quarters of the display area 22 is allocated to display area section 22a, which is then again the temporarily larger application area section, and one quarter to display area 22b, as shown in FIG. 9. The user has now good overview over the inbox again. The user can also simply touch (or tap with the stylus) any of the display area sections to render it the temporarily larger application area section.

The message list operates in a similar manner for a list of sent, drafted or deleted messages.

Figure 11:
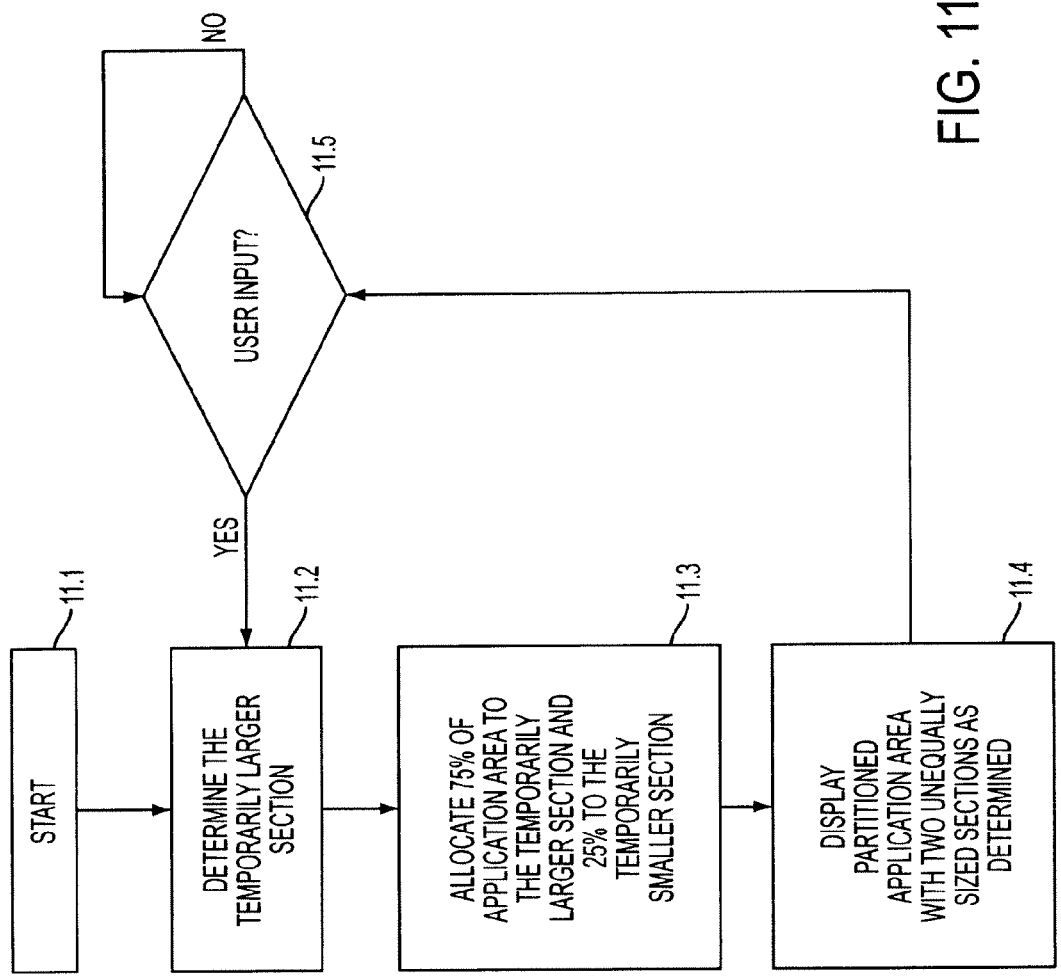
FIG. 11 is a flowchart illustrating a process for allocating display area to application area sections.

FIG. 11 shows a flowchart illustrating the application area allocation process according to a preferred embodiment of the invention. When an application that uses the dynamic application area allocation process is started in step 11.1, the processor determines in step 11.2 which of the application area sections 22a, 22b is per default the temporarily larger application area section. In step 11.3 the processor allocates three quarters (75%) of the application area 22 to the application area section that has been determined to be the larger one, and one quarter (25%) to the other (complementary) application area section. In step 11.4 the processor displays the partitioned application area with the two unevenly sized sections as determined in step 11.2 and 11.3. In step 11.5 the processor checks for user input, and continues doing so until user input is received. When user input is received the processor determines in step 11.2 which of the two application area sections is to be the temporarily larger one, and the process of steps 11.3, 11.4 and 11.5 is repeated. The effect of step 11.2 depends on the type of user input. If e.g. a list in an application area section that is already the temporarily larger section is scrolled, there will not be any change in the allocation of application space. If, however, an item from a list in a temporarily larger application area section is selected, the other application area section with details concerning the selected item will become the temporarily larger application area section. The ratio between the larger and the smaller application area sections can be fixed and predefined, or could be dependent on the content, type and amount of information to be displayed.

Figure 13:
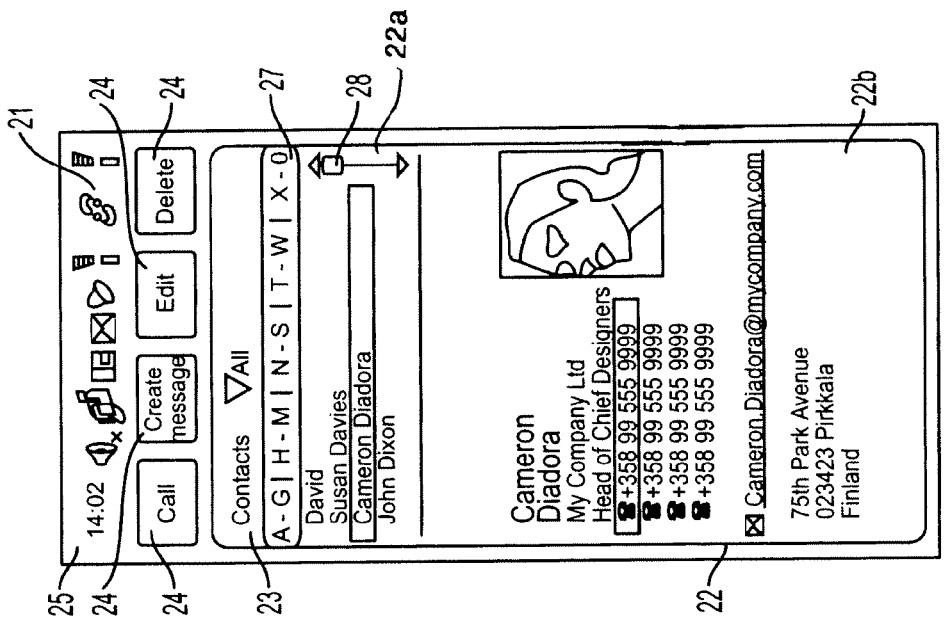
FIGS. 12 and 13 are screenshots of a phonebook application for the mobile communication terminal of FIG. 7.
Figure 12:
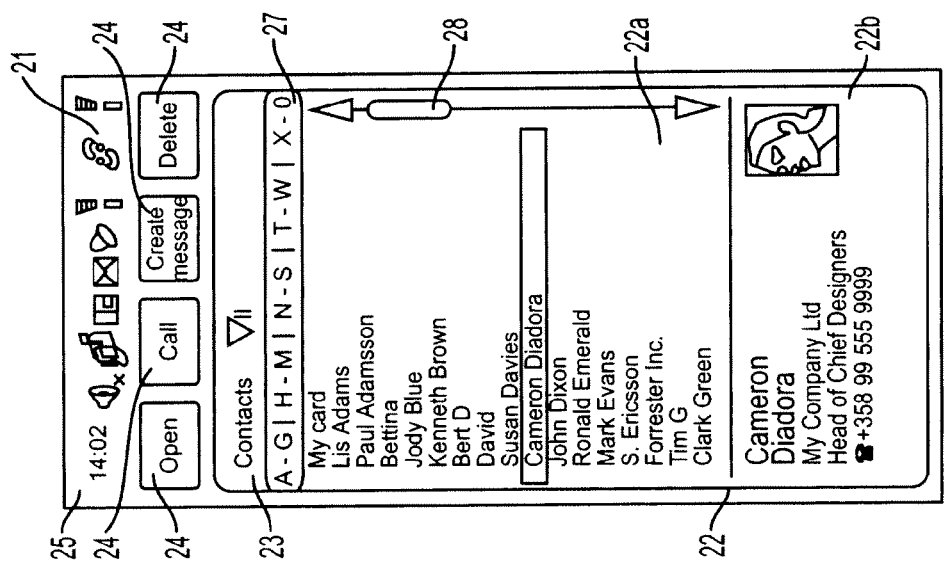

Referring now to FIGS. 12 and 13 there are shown screenshots of another application, a phonebook, using the dynamic application area allocation process according to a preferred embodiment. The phonebook application handles many types of address information, such as name, telephone numbers, address, company, e-mail, etc. The command buttons 24 have the functions "Open" (tapping this command button opens the highlighted contact entry), "Call" (tapping this command button initiates a call to the highlighted or open contact entry), "Create message" (tapping this command button creates a message for the highlighted or open message), "Delete" (tapping this command button deletes the highlighted or open contact entry), and (FIG. 13) "Edit" (tapping this command button enables the editing of the open contact entry). The title area 21 indicates the phonebook contact list showing all stored contacts. A selection bar 27 below the title area allows the user to select alphabetic ranges in the contact list. The application area 22 is partitioned into application area section 22a and application area section 22b.

Application area section 22a displays the basic data of the contacts entries (the first and last name) in the contact list as a scrollable list of selectable items. The contact entries can be listed in accordance with user selectable criteria, such as alphabetical after last or first name. A scroll bar 28 allows the user to scroll through the list by tapping or dragging with the stylus. The four-way navigation key 6 can also be used to scroll the list. When the phonebook is opened, about three quarters of the application area 22 is allocated to application area section 22a, which is in this state considered to be the temporarily larger application area section. This temporarily large section can therefore list a substantial number of contact entries, thus giving the user a good overview over the contact entry list.

One of the contact entries in the inbox is highlighted; default is the first contact entry on the list. The user can highlight a contact entry by tapping on it with the stylus, or by jumping the highlighting from one contact entry to the next on the list by using the four-way navigation key 6. Information concerning the highlighted contact entry is shown in temporarily smaller display area section 22b. Only about a quarter of the application area 22 is allocated to display area section 22b, and therefore only the contact name, company, title, primary phone number and small picture icon can be shown. Thus display area section 22b in this state functions as a preview window.

When the user selects the highlighted contact entry in the contact list, about three quarters of the display area 22 is allocated to display area section 22b which is then, the temporarily larger application area section, as shown in FIG. 13. The contact number, title, all phone and fax numbers, e-mail address and physical address can now be shown in display area section 22b. In this state display area section 22b functions as a contact study window. Some of the contact details in application area section 22b can be selectable items.

If the user returns to the contact list, by e.g. tapping on one of the contact entries in the contact list in application area section 22a, or by tapping/dragging the scrollbar 28, three quarters of the display area 22 is allocated to display area section 22a, which is then again the temporarily larger application area section, and one quarter to display area 22b, as shown in FIG. 12. The user now has good overview over the contact list again. The user can also simply touch (or tap with the stylus) any of the display area sections to render it to the temporarily larger application area section.

Both when application area section 22a is the temporarily larger section and when application area section 22b is the temporarily larger section the command buttons 24 can be used. When application area section 22a is the temporarily larger section the buttons 24 can be used to open, call, create a message for, or delete contacts. When application area section 22b is the temporarily larger section the command buttons 24 can be used to call, create a message for, edit, or delete contacts.

Figure 15:
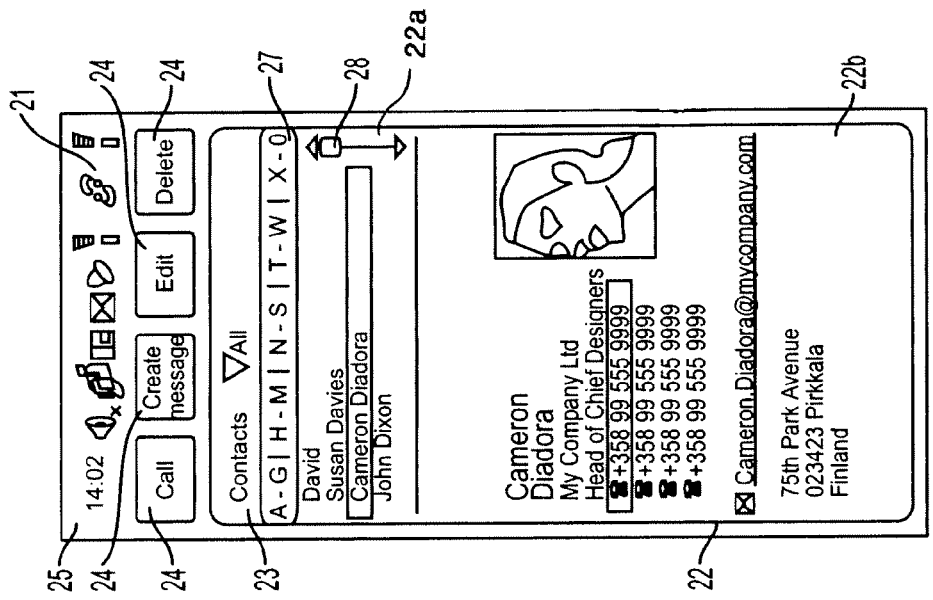
FIGS. 14 and 15 are screenshots of a variation of the phonebook application of FIGS. 12 and 13.
Figure 14:
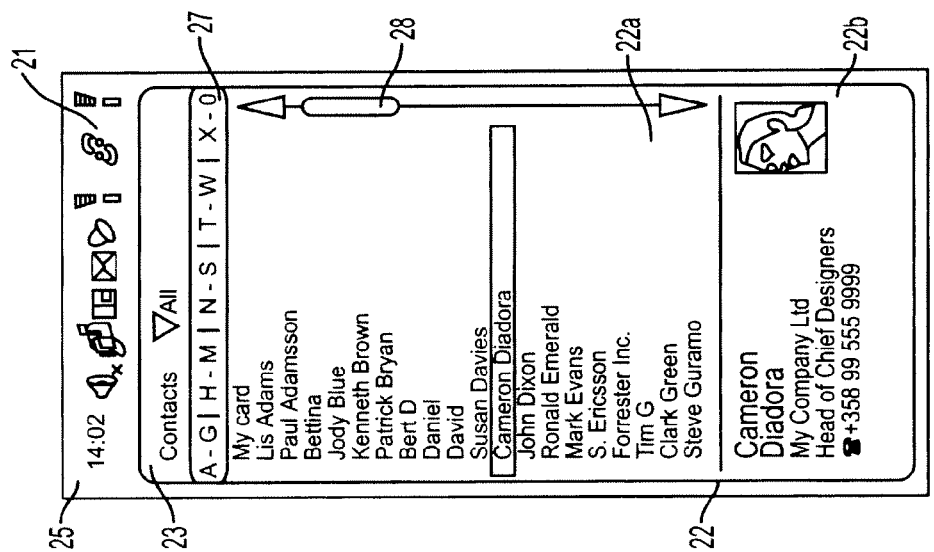

Referring now to FIGS. 14 and 15, screenshots are shown of a variation of the phonebook application described above. This variation could be realized by a change in the user controllable settings. In this variation the command buttons are not shown when application area section 22a with the contact entry list is the temporarily larger application area section. Once a user action causes application area 22b with the selected contact entry details/information to become the temporarily larger application area window the command buttons are displayed and can be used to work with the contact entry shown in application area section 22b. In this variation the size of display available for the contact list is maximized, giving the user even further improved overview of the list.

Figure 16:
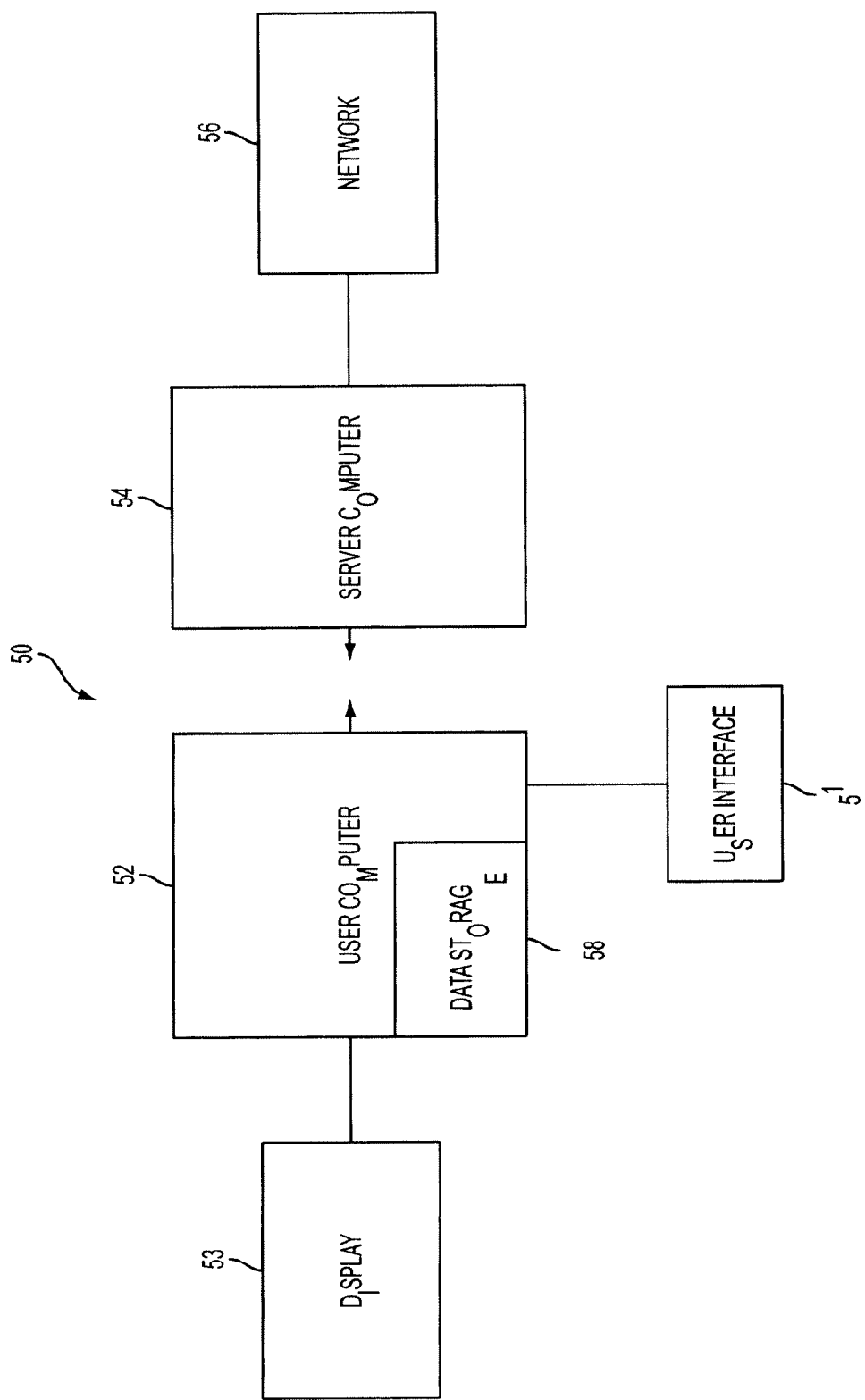
FIG. 16 is a block diagram of one embodiment.

The present invention may also include software and computer programs incorporating the process steps and instructions described above that are executed one or more. FIG. 16 is a block diagram of one embodiment of a typical apparatus 50 incorporating features of the present invention that may be used to practice the present invention. As shown, a computer system 52 may be linked to another computer system 54, such that the computers 52 and 54 are capable of sending information to each other and receiving information from each other. In one embodiment, computer system 50 could include a server computer 54 adapted to communicate with a network 56, such as for example, a mobile communication system. Computer systems 52 and 54 can be linked together in any conventional manner including a modem, hard wire connection, wireless connection or fiber optic link. Generally, information can be made available to both computer system 52 and 54 using a communication protocol typically sent over a communication channel or through a dial-up connection on ISDN line. Computer 52 is generally adapted to utilize program storage devices embodying machine readable program source code which is adapted to cause the computer 52 to perform the method steps of the present invention. The program storage devices incorporating features of the present invention may be devised, made and used as a component of a machine utilizing optics, magnetic properties and/or electronics to perform the procedures and methods of the present invention. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer system 52 may also include a microprocessor for executing stored programs. Computer 52 may include a data storage device 58 on its program storage device for the storage of information and data. The computer program or software incorporating the processes and method steps incorporating features of the present invention may be stored in one or more computers 52 and 54 on an otherwise conventional program storage device. In one embodiment, computer 52 may include a user interface 51, and a display interface 53 from which features of the present invention can be accessed. The user interface 58 and the display interface 53 can be adapted to allow the input of queries and commands to the system, as well as present the results of the commands and queries.

In one embodiment, the aspects of the disclosed embodiments include a computer program product comprising a computer useable medium having computer readable code means embodied therein for causing a computer to initialize an application stored in the terminal. The computer readable code means in the computer program product comprises computer readable program code means for causing a computer to designate a portion of the user interface as a primary area; computer readable program code means for causing a computer to designate another portion of the user interface as a secondary area; computer readable program code means for causing a computer to, in an initial state of the user interface, allocate a larger portion of the user interface display area to the primary area relative to the secondary area; computer readable program code means for causing a computer to display a list of user selectable items in the primary area; computer readable program code means for causing a computer to display at least a portion of a content of one of the user selectable items in the secondary area when the user selectable item is highlighted in the primary area; computer readable program code means for causing a computer to transition to a second state when the user selectable item is selected, the second state comprising expanding a size of the secondary area and correspondingly reducing a size of the primary area; computer readable program code means for causing a computer to display a content of the selected user selectable item in the expanded secondary area; and computer readable program code means for causing a computer to display at least a portion of the user selectable items in the reduced primary area.

In another aspect, the disclosed embodiments are directed to an article of manufacture comprising a computer useable medium having computer readable program code means embodied therein for causing a computer to initialize an application stored in the terminal. The computer readable code means in the article of manufacture comprises computer readable program code means for causing a computer to designate a portion of the user interface as a primary area; computer readable program code means for causing a computer to designate another portion of the user interface as a secondary area; computer readable program code means for causing a computer to allocate a larger portion of the user interface display area to the primary area relative to the secondary area in an initial state of the user interface; computer readable program code means for causing a computer to display a list of user selectable items in the primary area; computer readable program code means for causing a computer to display at least a portion of a content of one of the user selectable items in the secondary area when the user selectable item is highlighted in the primary area; computer readable program code means for causing a computer to expand a size of the secondary area and correspondingly reduce a size of the primary area in a second state when one of the user selectable items is selected; computer readable program code means for causing a computer to display a content of the selected user selectable item in the expanded secondary area; and computer readable program code means for causing a computer to display at least a portion of the user selectable items in the reduced primary area.

The dynamic application area allocation process has been described with reference to two applications selected for illustration purposes. It is clear that this process can advantageously be used with many other types of applications, such as:

Printjobs: a list of queuing printjobs in one section and details of a highlighted printjobs in the other section;

downloads/uploads: a list of downloads/uploads in progress in one section and details of a highlighted download/upload in the other section;

image browsing: a list of image files in one section and a thumbnail of a highlighted image in the other section, the thumbnail changing to a larger image when the section concerned becomes the temporarily larger section;

calendar: a week overview in a first section, and details of a highlighted day in a second section, when the week overview section is the temporarily larger section, it indicates the calendar entries and possibly the times allocated to the calendar entries, whilst the second section displays the current day in more detail. When the application area allocation is switched, the day is shown in full detail in the second (now large) section with notes about the calendar entries and the fist section (now small) only displays a week overview.

The applications that operate with dynamic application space allocation in accordance with the present invention can be base software, lead software or native applications. The division of the application space does not need to be three quarter to one quarter, any uneven distribution of the application space, i.e. 60:40, 70:30, 75:25 or 80:20 can be applied. For display areas partitioned into three areas the division could e.g. be 50:25:25, 50:30:20 or 60:15:15. The selectable items in an application area section do not need to be presented in the form of a list; other arrays such as a grid can also be used, in particular if a plurality of icons or thumbnail type items are listed.

The ratio of the allocation is according to a further preferred embodiment be flexibly dependent on the amount of data to be presented in the respective sections, i.e. if a first section displays a list with only two entries, it the ratio be e.g. 55/45, instead of 70/30 when the list has 30 entries. The ratio could also depend on the amount of information in the section that displays the detailed information. If an e-mail to be displayed in the section with detailed information is very short, the maximum size of the detailed segment could be limited to 35% of the application area. If the e-mail to be displayed is however very long, 80% of the application area could be allocated to the detailed section.

Although the present invention has been described in detail for purpose of illustration, it is understood that such detail is solely for that purpose, and variations can be made therein by those skilled in the art without departing from the scope of the invention.

The invention claimed is:

1. A mobile communication terminal comprising:
    a user interface including a display component and an input component;
    a processor being configured to control operation of said terminal including being configured to receive input from a user through the input component, and to run an application on said terminal;
    said processor also being configured to show a partitioned application area for an application with two or more application area sections on said display component when the application is running on the terminal;
    said processor further being configured to at least temporarily define an initial one of said application area sections as an initial larger application area section within the partitioned application area, and simultaneously at least temporarily define a complementary one of said application area sections as an initial smaller application area section within the partitioned application area, wherein the initial one of the application area sections includes a first information set related to a first application and the complementary one of the application area sections includes a second information set related to a second application, and wherein a smaller application area only displays a portion of a corresponding information set;

said processor moreover being configured to, in response to a detection of a selection input in the initial smaller application area section, at least temporarily redefine said initial larger application area section as a second smaller application area section within the partitioned application area, and simultaneously at least temporarily redefine said initial smaller application area section as a second larger application area section within the partitioned application area; and wherein the initial larger application area section displays a plurality of selectable items with one of the items highlighted, and the initial smaller application area section displays details of the highlighted item, the processor being further configured to the redefine the initial smaller application area section as the second larger application area section upon detection of the selection of a selectable item in the initial first application area section;

said processor being configured to allocate a ratio of respective areas between each larger application area section and each smaller application area section within said partitioned application area.

2. A mobile communication terminal according to claim 1, wherein said processor is further configured to, upon detection of a selection of an item or object in the second smaller application area redefine said the second smaller application area section as the initial larger application area section.

3. A mobile communication terminal according to claim 1, wherein at least a part of the information displayed in the second larger application area section is in the form of selectable items.

4. A mobile communication terminal according to claim 2, wherein the amount of information concerning the item selected in the initial larger application area sections is increased when the initial smaller application area section becomes the second larger application area section.

5. A mobile communication terminal according to claim 1, wherein said display component and said input component comprises a touch screen.

6. A mobile communication terminal according to claim 5 wherein said processor is configured to display one or more command buttons on said touch screen simultaneously with said partitioned application area.

7. A mobile communication terminal according to claim 5, wherein said processor is configured to display one or more command buttons on said touchscreen only when one of one or more predetermined application areas is a larger application area section, and wherein an area used for displaying the command buttons is taken from said partitioned application area.

8. A mobile communication terminal according to claim 7, wherein the function and number of the command buttons is specific for each of the application area sections.

9. A mobile communication terminal according to claim 5, wherein said application is a phone or address book, and one of said application area sections displays a list of selectable phone or address book entries of which one is highlighted, and another of said application area sections displays details concerning the highlighted phone or address book entry.

10. A mobile communication terminal according to claim 5, wherein said application is a messaging application, and one of said application area sections displays a list of received, sent, deleted or drafted messages of which one is highlighted, and another of said application area sections displays details concerning the highlighted message.

11. A method comprising:

operating a user interface of a mobile communication terminal having a display component and an input component and running an application;

showing a partitioned application area with two or more application area sections on said display component;

temporarily defining an initial one of said application area sections as a larger application area section within the partitioned application area; and simultaneously at least temporarily defining a complementary one of said application area sections as a smaller application area section within the partitioned area, wherein the initial one of the application area sections includes a first information set related to a first application and the complementary one of the application area sections includes a second information set related to a second application, and wherein a smaller application area only displays a portion of a corresponding information set;

temporarily redefining said initial one of said application area sections as a smaller application area section within the partitioned application area, and simultaneously at least temporarily redefining said complementary one of said application are sections as a larger application area section within the partitioned application area in response to detection of an input to the initial smaller application area section;

allocating a ratio of respective areas between each of the larger application area sections and each of the smaller application area sections within said partitioned application area; and displaying a plurality of selectable items with one of the items highlighted in a first one of said application area sections, and displaying in a second one of said application area sections details of the highlighted item and redefining said second one of said application area sections as the larger application area section upon detection of a selection a selectable item in said first one of said application area sections.

12. A method according to claim 11, further comprising, upon detection of a selection of an item or object in the second one of said application area sections, subsequently redefining said first one of said application area sections as the larger application area section when the second one of said application area sections is the larger application area section.

13. A method according to claim 11, further comprising displaying at least a part of the information in the second one of said application area sections in the form of selectable items when the second one of said application area sections is the larger application area section.

14. A method according to claim 12, further comprising increasing the amount of displayed information in the second one of said application area sections related to the item selected in the first one of said application area sections when the second one of said application area sections becomes the larger application area section.

15. A method according to claim 11, wherein said display component and said input component comprises a touch screen.

16. A method according to claim 15, further comprising displaying one or more command buttons on said touch screen simultaneously with said partitioned application area.

17. A method according to claim 15, further comprising displaying one or more command buttons on said touchscreen only when at least one of one of the two or more application areas is the larger application area section, and taking the area used for displaying said command buttons from said partitioned application area.

18. A method according to claim 15, wherein the function and the number of command buttons is specific for each application area section.

19. A computer-readable medium containing instructions for controlling a mobile communication terminal with a display component and an input component to:
- show a partitioned application area with two or more application area sections on said display component when an application is running;
- temporarily define an initial one of said application area sections as a larger application area section within the partitioned application area; and simultaneously at least temporarily define a complementary one of said application area sections as a smaller application area section within the partitioned area, wherein the initial one of the application area sections includes a first information set related to a first application and the complementary one of the application area sections includes a second information set related to a second application, and wherein a smaller application area only displays a portion of a corresponding information set;
- temporarily redefine said initial one of said application area sections as a smaller application area section as shown within the partitioned application area, and simultaneously at least temporarily redefining said complementary one of said application are sections as a larger application area section as shown within the partitioned application area in response to detection of an input;
- allocate a ratio of respective areas between the larger application area section and the smaller application area section within said partitioned application area; and
- display a plurality of selectable items with one of the items highlighted in a first one of said application area sections, and displaying in a second one of said application area sections details of the highlighted item and redefining said second one of said application area sections as the larger application area section upon detection of a selection a selectable item in said first one of said application area sections.

20. A computer-readable medium according to claim 19, wherein said ratio is larger than 1:1 and smaller than 1:0, said ratio preferably between being in the range between 3:2 and 9:1.

21. A computer-readable medium according to claim 20, wherein said ratio is redefined in response to the type and amount of information to be displayed in the respective application area sections.

22. A computer program product comprising:
- a non-transitory computer useable medium having computer readable code means embodied therein for causing a computer to initialize an application stored in the terminal, the computer readable code means in the computer program product comprising:
- computer readable program code means for causing a computer to designate a portion of the user interface as a primary area;
- computer readable program code means for causing a computer to designate another portion of the user interface as a secondary area;
- computer readable program code means for causing a computer to, in an initial state of the user interface, allocate a larger portion of the user interface display area to the primary area relative to the secondary area;
- computer readable program code means for causing a computer to display a list of user selectable items in the primary area;
- computer readable program code means for causing a computer to display at least a portion of a content of one of the user selectable items in the secondary area when the user selectable item is highlighted in the primary area;
- computer readable program code means for causing a computer to transition to a second state when the user selectable item is selected, the second state comprising expanding a size of the secondary area and correspondingly reducing a size of the primary area;
- computer readable program code means for causing a computer to display a content of the selected user selectable item in the expanded secondary area; and
- computer readable program code means for causing a computer to display at least a portion of the user selectable items in the reduced primary area.

23. An article of manufacture comprising:
- a non-transitory computer useable medium having computer readable program code means embodied therein for causing a computer to initialize an application stored in the terminal, the computer readable code means in the article of manufacture comprising:
- computer readable program code means for causing a computer to designate a portion of the user interface as a primary area;
- computer readable program code means for causing a computer to designate another portion of the user interface as a secondary area;
- computer readable program code means for causing a computer to allocate a larger portion of the user interface display area to the primary area relative to the secondary area in an initial state of the user interface;
- computer readable program code means for causing a computer to display a list of user selectable items in the primary area;
- computer readable program code means for causing a computer to display at least a portion of a content of one of the user selectable items in the secondary area when the user selectable item is highlighted in the primary area;
- computer readable program code means for causing a computer to expand a size of the secondary area and correspondingly reduce a size of the primary area in a second state when one of the user selectable items is selected;
- computer readable program code means for causing a computer to display a content of the selected user selectable item in the expanded secondary area; and
- computer readable program code means for causing a computer to display at least a portion of the user selectable items in the reduced primary area.

* * * * *